United States Patent

Bensky

(10) Patent No.: US 6,733,127 B2
(45) Date of Patent: May 11, 2004

(54) COLORED CONTACT LENS FOR USE AS A TRIAL LENS

(75) Inventor: Freddie Bensky, Helsinki (FI)

(73) Assignee: CL-TINTERS OY, Helsinki (FI)

( * ) Notice: Subject to any disclaimer, the term of this patent is extended or adjusted under 35 U.S.C. 154(b) by 0 days.

(21) Appl. No.: 10/205,876

(22) Filed: Jul. 24, 2002

(65) Prior Publication Data

US 2003/0234906 A1 Dec. 25, 2003

(51) Int. Cl.[7] .................................................. G02C 7/04
(52) U.S. Cl. ........................................ 351/162; 351/219
(58) Field of Search ........................ 351/160 R, 160 H, 351/161, 162, 177, 219

(56) References Cited

U.S. PATENT DOCUMENTS 6,196,683 B1 * 3/2001 Quinn et al. ................ 351/162

2002/0167640 A1 * 11/2002 Francis et al. ............... 351/162
2003/0117576 A1 * 6/2003 Thakrar et al. .............. 351/162

* cited by examiner

Primary Examiner—Scott J. Sugarman
(74) Attorney, Agent, or Firm—Merchant & Gould, P.C.

(57) ABSTRACT

A colored contact lens for use as a trial lens, consisting of a circular plastic lens having a convex outer surface and comprising a clear limbal ring (1) at the outer edge of the lens, a clear pupillary part (2) in the middle of the lens and an iris ring (3) between the limbal ring and the pupillary part, the iris ring being provided with a continuous pattern formed by a coloring agent. According to the invention, the iris ring comprises a visually perceptible discontinuity area that breaks the continuous pattern.

14 Claims, 4 Drawing Sheets

COLORED CONTACT LENS FOR USE AS A TRIAL LENS

BACKGROUND OF THE INVENTION

1. Field of the Invention

The present invention relates to a colored contact lens designed to be used as a trial lens.

2. Related Art

The use of contact lenses to improve the optical properties of the eye and for reasons of appearance in continuously becoming more popular. One of the obstacles to more widespread use is the great diversity of the properties of human eyes, i.e. the fact that some people can directly start wearing contact lenses and others need a long break-in period while some people's eyes never become adapted to contact lenses. For this reason, before making an actual buying decision or before buying e.g. a batch of dozens of disposable lenses, a person needs to have a chance to try the lenses to see whether his/her eyes get adapted to them.

To lower the threshold to the use or at least trial of contact lenses, manufacturers of contact lenses have introduced the practice of delivering trial lenses or test lenses free of charge to allow the user to establish whether his/her eyes will adapt to wearing contact lenses. Since the eye is a very delicate organ and sensitive to any foreign elements and also very susceptible to injury, trial lenses have to be manufactured with absolute precision and in a manner fully corresponding to actual contact lenses. Therefore, contact lenses must be completely equivalent to actual contact lenses in respect of all their properties.

To ensure that people will not make illegal use of trial lenses by getting new trial lenses again and again from different dealers, manufacturers have provided trial lenses with a marking text like 'test', 'trial' or 'demo', printed either in the limbal part or on the iris ring. In spite of this, trade in free trial lenses has become a significant business, in other words, there are persons who visit different contact lens dealers to get free trial lenses, which they then sell on suitable markets for a good price.

SUMMARY OF THE INVENTION

The object of the invention is to eliminate the above-mentioned drawbacks. A specific object of the invention is to disclose a colored contact lens that is completely equivalent to actual contact lenses in respect of its optical properties but that is visually sufficiently different from actual contact lenses to ensure that it can only be used for a short time as a trial lens.

The colored contact lens used as a trial lens consists of a circular plastic lens having a convex outer surface and comprising a clear limbal ring at the outer edge of the lens and a clear pupillary part in the middle of the lens. In addition, the lens has between the limbal ring and the pupillary part an iris ring provided with a continuous pattern produced with a coloring agent. The continuous pattern may consist of a substantially uniform colored surface, repeated texture, continuous coherent form or continuous random texture surface. According to the invention, the iris ring comprises a visually perceptible discontinuity area that breaks the continuous pattern. In other words, according to the invention, the iris ring has a distinct, visible area that differs from the continuous pattern, a shape of colored surface that gives the contact lens an appearance producing a definitely unsatisfactory impression.

The discontinuity area comprises a proportion of 5–90%, possibly 10–30%, e.g. 12–20% of the total area of the iris ring.

The discontinuity area is preferably a clear area without coloring agent, in other words, it is produced by leaving a given area of the iris ring free of coloring agent when the contact lens is being colored. Another possibility is to give the discontinuity area a color that differs from the pattern, in other words, the discontinuity area is tinted with a color differing from the main iris ring color. In this case, the color used preferably differs an much as possible from the color of the iris ring.

In general, the iris ring pattern and coloring of a colored contact lens are designed to imitate the pattern of the iris ring of a real eye, i.e. its random radial stripe pattern with varying width of and spaces between the stripes. However, it is possible that the coloring agent used in the iris ring of the trial lens forms a substantially uniform dye layer on the colored surface of the iris ring, the coloring agent forms a substantially cyclically varying pattern on the colored surface of the iris ring or the coloring agent forms distinct sharp shapes or patterns on the colored surface of the iris ring.

The invention does not define the shape of the discontinuity area to be used in the iris ring in any way; instead, the discontinuity area may have the shape of e.g. a sector, a segment, a strip of substantially even width going through the iris ring of the lens, an area of determined or undetermined shape, or it may consist of several separate sub-areas of varying shape without coloring agent or provided with a differing coloring agent.

The colored contact lens of the invention has many significant advantages as compared with prior art. In respect of its optical properties, the contact lens of the invention is completely equivalent to a normal colored contact lens. The fit of the lens and the eye response produced by it fully correspond to a normal contact lens. Yet it looks so anomalous, abnormal and defective that hardly anyone would like to wear such lenses longer than necessary for trial, and consequently nobody is willing to pay anything for them. Thus, as demand fades, there will be an end to the practice of collecting and selling free trial lenses. Besides, if the discontinuity area is clear and untinted, the user can easily compare his/her own iris visible through it with the colored iris ring and thus clearly see the color change of his/her eye before making a final purchase decision.

BRIEF DESCRIPTION OF THE DRAWINGS

In the following, the invention will be described in detail with reference to the attached drawings, wherein.

DETAILED DESCRIPTION OF THE DRAWINGS

The figures show a colored contact lens in top view, i.e. as seen on the user's eye. The lens comprises a clear limbal ring 1 at the outer edge and a clear pupillary part 2 in the middle of the lens. Between these parts there remains a ring-like area, i.e. an iris ring 3, which in colored contact lenses can be tinted so as to give it a desired appearance in respect of both patterning and coloring.

Figure 7:
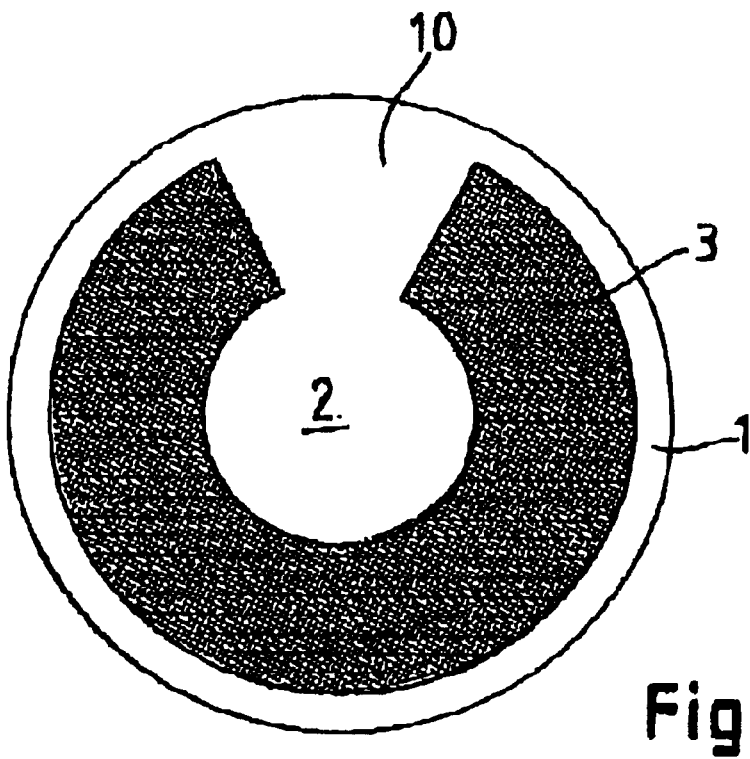
FIG. 7 presents a seventh embodiment of the invention.
Figure 8:
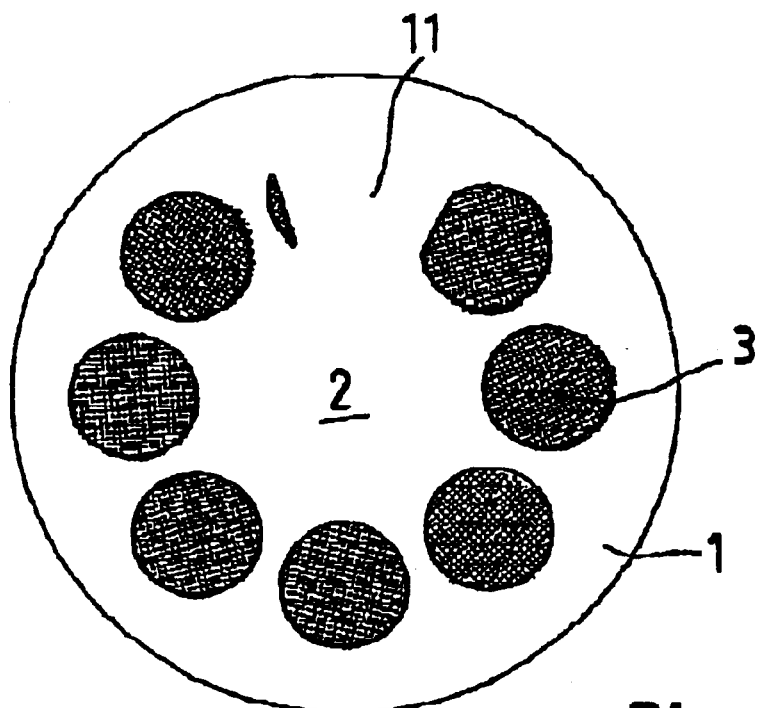
FIG. 8 presents an eighth embodiment of the invention.

In FIGS. 1–6, the iris ring is provided with a tinted pattern corresponding to a normal iris pattern of the eye, whereas if FIGS. 7 and 8 the iris ring has been tinted with a uniform and unvarying dye layer.

Figure 1:
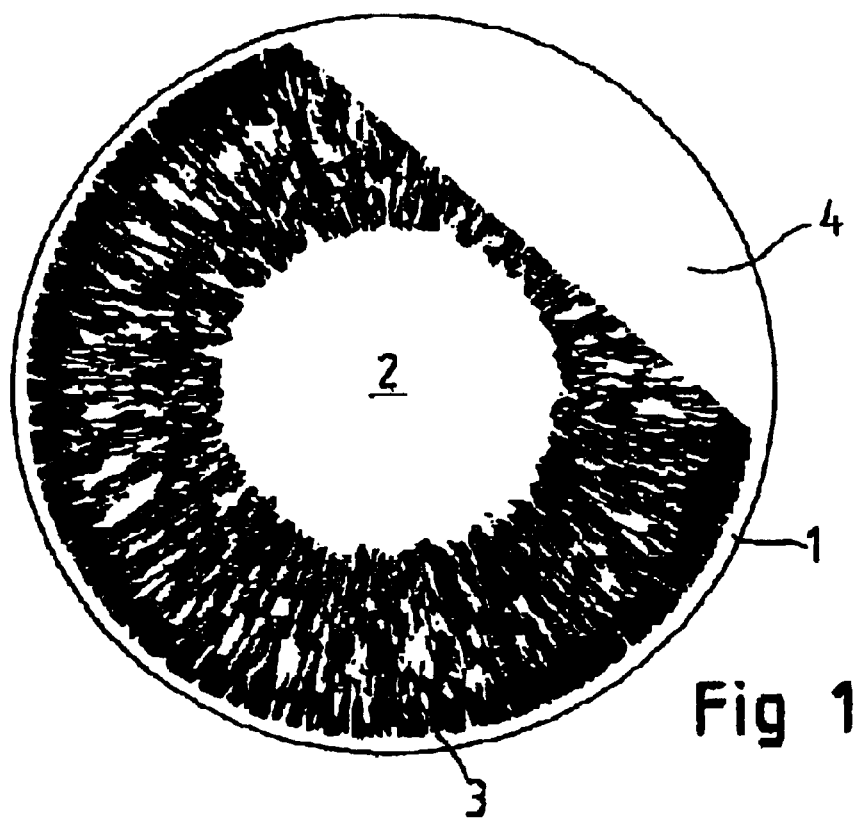
FIG. 1 presents an embodiment of the invention.
Figure 2:
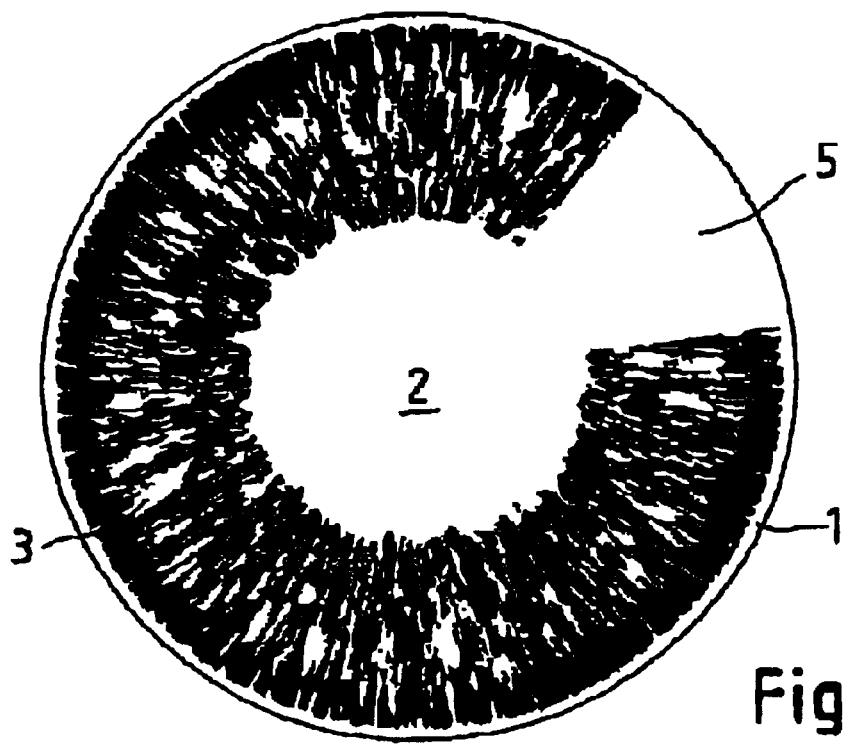
FIG. 2 presents a second embodiment of the invention.
Figure 3:
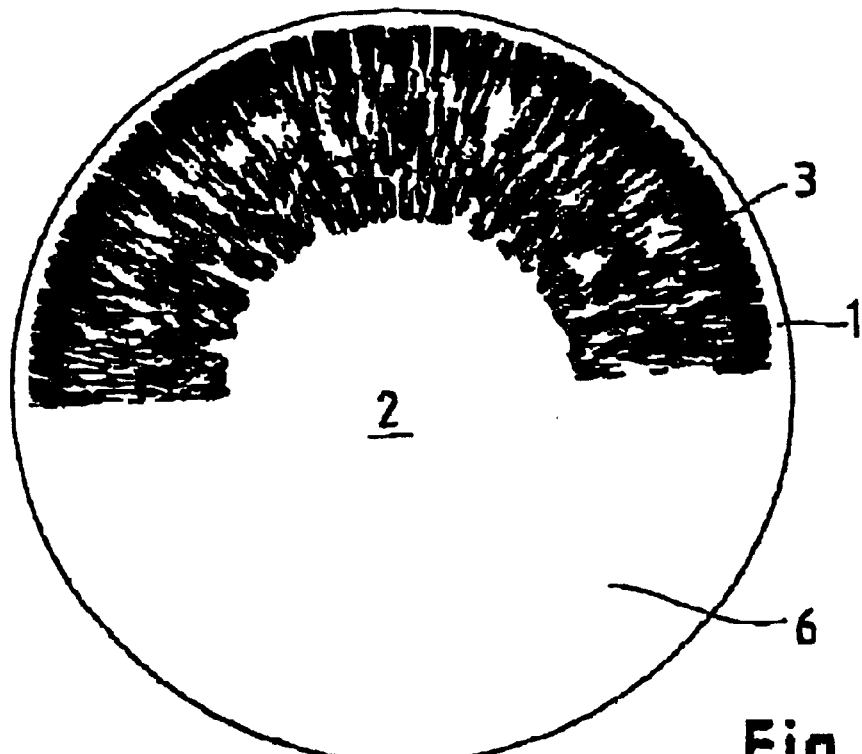
FIG. 3 presents a third embodiment of the invention.

In FIG. 1, the iris ring has been provided with a discontinuity area 4 according to the invention by leaving a segment of about 120° without coloring agent. In FIG. 2, the discontinuity area 5 consists of a sector of about 40° without coloring agent. In FIG. 3, the discontinuity area 6 consists of a 180° sector, i.e. a semi-circle with no coloring agent.

Figure 4:
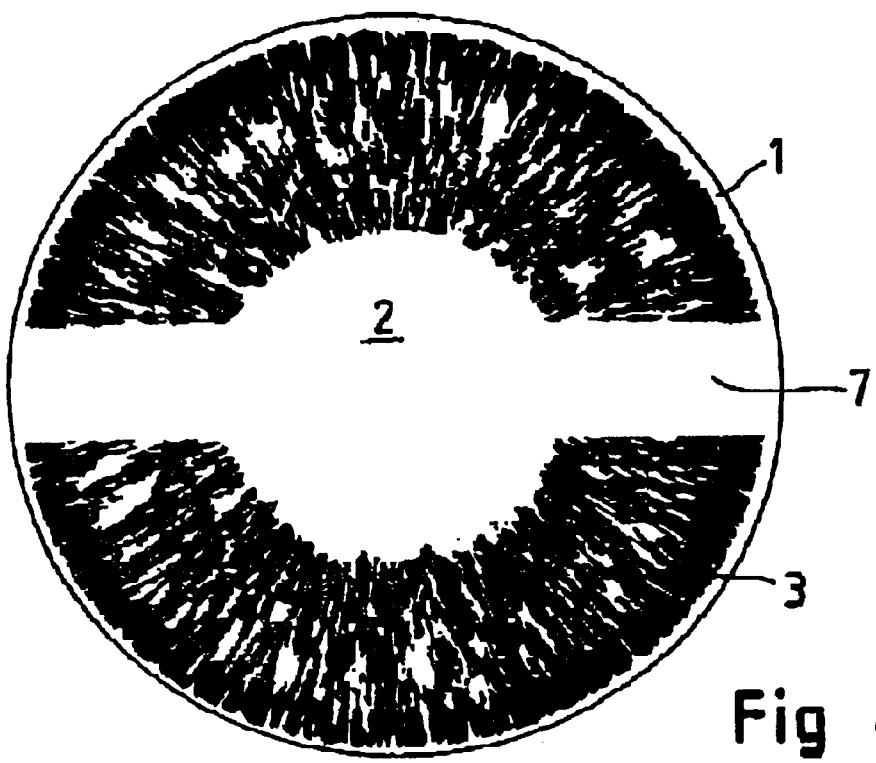
FIG. 4 presents a fourth embodiment of the invention.
Figure 5:
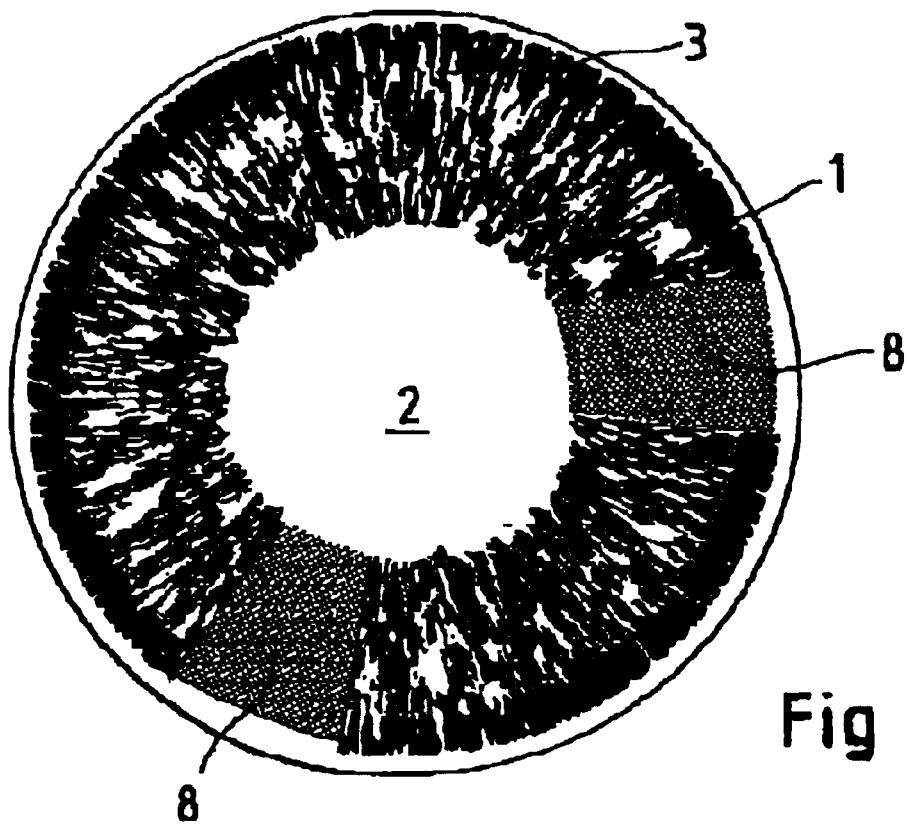
FIG. 5 presents a fifth embodiment of the invention.
Figure 6:
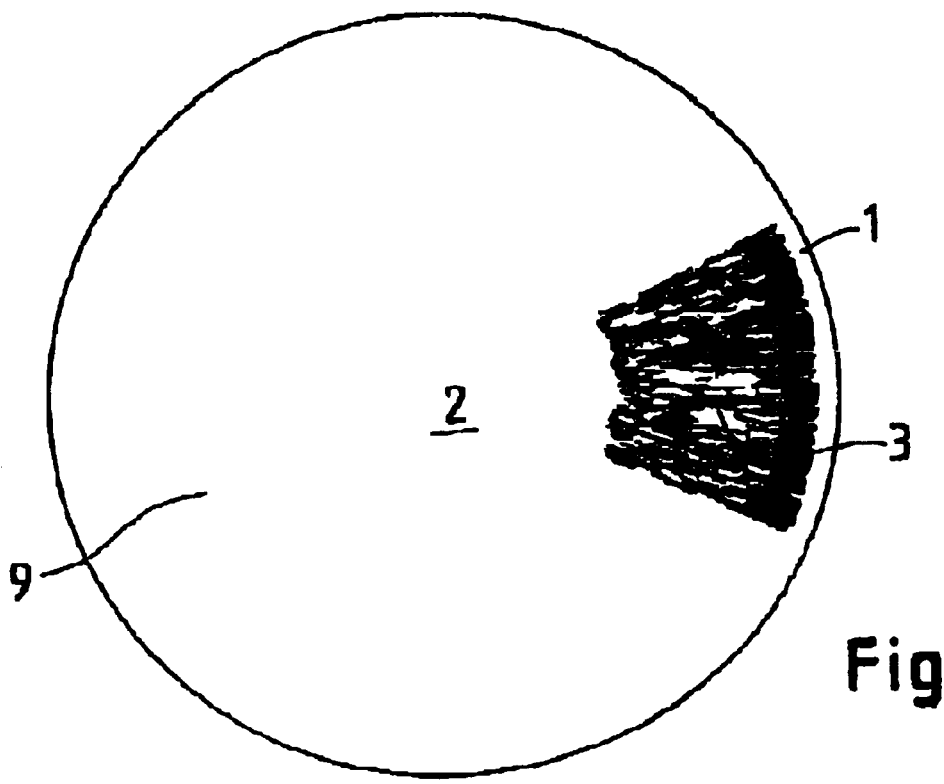
FIG. 6 presents a sixth embodiment of the invention.

In FIG. 4, the discontinuity area 7 consists of a strip of even width with no coloring agent, extending through the iris ring 3. In FIG. 5, the iris ring 3 is provided with two discontinuity areas 8 consisting of sectors of about 30°, tinted with a color clearly differing from the rest of the iris ring. In the embodiment presented in FIG. 6, the discontinuity area 9 is a clear and untinted area that covers most of the iris ring 3, only a sector of about 45° of the iris ring being tinted with a real color.

FIG. 7 presents an embodiment of the invention in which the iris ring 3 has been tinted with a substantially smooth coloring agent, with a clear discontinuity area 10 of the shape of a sector of about 45° in the ring area.

FIG. 8 presents yet another embodiment of the invention, in which the iris ring 3 is provided with a number of repeated patterns, in this case circles, formed by a coloring agent. The discontinuity area 11 consists of a sector of about 45°, in which area the patterns repeated in the iris ring 3 are missing and the lens is clear and transparent.

In the foregoing, the invention has been described by way of example with reference to the attached drawings while different embodiments of the invention are possible within the scope defined in the

What is claimed is:

1. Colored contact lens for use as a trial lens, consisting of a circular plastic lens having a convex outer surface and comprising a clear limbal ring at the outer edge of the lens, a clear pupillary part in the middle of the lens and an his ring between the limbal ring and the pupillary part, the iris ring being provided with a continuous pattern formed by a coloring agent, wherein the iris ring comprises a visually perceptible discontinuity area that is clear and does not include the coloring agent so as to break the continuous pattern.

2. Contact lens according to claim 1, wherein the discontinuity area covers about 5–90% of the total area of the iris ring.

3. Contact lens according to claim 1, wherein the discontinuity area is clear and without coloring agent.

4. Contact lens according to claim 1, wherein the discontinuity area is of a color differing from that of the pattern.

5. Contact lens according to claim 1, wherein the coloring agent forms a substantially uniform dye layer on the colored area of the iris ring.

6. Contact lens according to claim 1, wherein the coloring agent forms a substantially cyclically varying pattern on the tinted area of the iris ring.

7. Contact lens according to claim 1, wherein the coloring agent forms separate sharp shapes or patterns in the tinted area of the iris ring.

8. Contact lens according to claim 1, wherein the discontinuity area comprises less than half of the total area of the his ring.

9. Contact lens according to claim 1, wherein the discontinuity area comprises 10–30% of the total area of the iris ring.

10. Contact lens according to claim 1, wherein the discontinuity area is the shape of a sector.

11. Contact lens according to claim 1, wherein the discontinuity area is the shape of a segment.

12. Contact lens according to claim 1, wherein the discontinuity area is a strip of substantially even width going through the iris ring of the lens.

13. Contact lens according to claim 1, wherein the discontinuity area consists of several separate sub-areas with no coloring agent.

14. A trial contact lens, comprising:
 a circular plastic lens having a clear pupillary part oriented at a middle of the circular plastic lens; and
 a continuous pattern of coloring agent formed on the lens as an iris ring, the iris ring being spaced radially outward from the clear pupillary part and including a visually perceptible discontinuity in the pattern that does not include the coloring agent.

\* \* \* \* \*